US012793334B2

(12) United States Patent
Li et al.

(10) Patent No.: US 12,793,334 B2
(45) Date of Patent: Nov. 10, 2026

(54) METHOD AND ELECTRONIC DEVICE FOR CONSTRUCTING CARTOONIZATION MODELS, STORAGE MEDIUM, AND PROGRAM PRODUCT

(71) Applicant: BIGO TECHNOLOGY PTE. LTD., Mapletree Business City (SG)

(72) Inventors: An Li, Guangzhou (CN); Yule Li, Guangzhou (CN); Wei Xiang, Guangzhou (CN)

(73) Assignee: BIGO TECHNOLOGY PTE. LTD., Mapletree Business City (SG)

( * ) Notice: Subject to any disclaimer, the term of this patent is extended or adjusted under 35 U.S.C. 154(b) by 219 days.

(21) Appl. No.: 18/708,835

(22) PCT Filed: Nov. 16, 2022

(86) PCT No.: PCT/CN2022/132131
§ 371 (c)(1),
(2) Date: May 9, 2024

(87) PCT Pub. No.: WO2023/088276
PCT Pub. Date: May 25, 2023

(65) Prior Publication Data
US 2025/0005839 A1 Jan. 2, 2025

(30) Foreign Application Priority Data
Nov. 16, 2021 (CN) ......................... 202111356773.X

(51) Int. Cl.
*G06T 17/00* (2006.01)
*G06N 3/0475* (2023.01)
(Continued)

(52) U.S. Cl.
CPC ........... *G06T 17/00* (2013.01); *G06N 3/0475* (2023.01); *G06T 11/60* (2013.01); *G06T 15/02* (2013.01); *G06V 10/7715* (2022.01)

(58) Field of Classification Search
CPC ......... G06T 15/02; G06T 11/00; G06T 11/60; G06T 13/40; G06T 17/00; G06N 3/0475;
(Continued)

(56) References Cited

U.S. PATENT DOCUMENTS

2019/0340419 A1* 11/2019 Milman ................ G06V 10/82
2021/0358177 A1* 11/2021 Park ......................... G06N 3/09
(Continued)

FOREIGN PATENT DOCUMENTS

CN 109800732 A 5/2019
CN 109816589 A 5/2019
(Continued)

OTHER PUBLICATIONS

Viazovetskyi et al. "StyleGAN2 Distillation for Feed-forward Image Manipulation", arXiv:2003.03581v2 (Year: 2020).*
(Continued)

*Primary Examiner* — Kee M Tung
*Assistant Examiner* — Xiaoming Wei
(74) *Attorney, Agent, or Firm* — Dilworth & Barrese, LLP.; Michael J. Musella, Esq.

(57) ABSTRACT

A method for constructing cartoonization models is provided. The method includes: generating a predetermined number of sample authentic images using a pre-trained first generative model; constructing a second generative model based on the first generative model, and generating a sample cartoon image corresponding to each of the sample authentic images using the second generative model; acquiring a sample image pair by combining the each of the sample authentic images with the corresponding sample cartoon
(Continued)

image; and generating a cartoonization model for converting a target image into a fully cartoonized image by fitting, based on a sample set consisting of multiple sample image pairs, a predetermined initial cartoonization model with a weight corresponding to the second generative model as an initial weight.

15 Claims, 8 Drawing Sheets

(51) Int. Cl.

| | |
|---|---|
| ***G06T 11/60*** | (2026.01) |
| ***G06T 15/02*** | (2011.01) |
| ***G06V 10/77*** | (2022.01) |

(58) Field of Classification Search
CPC .......... G06N 3/04; G06N 3/045; G06N 3/047; G06N 3/08; G06N 3/088; G06V 10/7715
See application file for complete search history.

(56) References Cited

U.S. PATENT DOCUMENTS

| | | | | |
|---|---|---|---|---|
| 2022/0375024 | A1* | 11/2022 | Luo ...................... | G06N 3/0464 |
| 2024/0119707 | A1 | 4/2024 | Li et al. | |

FOREIGN PATENT DOCUMENTS

| | | | |
|---|---|---|---|
| CN | 110070483 | A | 7/2019 |
| CN | 110097086 | A | 8/2019 |
| CN | 112561786 | A | 3/2021 |
| CN | 112862669 | A | 5/2021 |
| CN | 113326531 | A | 8/2021 |
| CN | 114067052 | A | 2/2022 |
| RU | 2708027 | C1 | 12/2019 |
| WO | 2020091891 | A1 | 5/2020 |

OTHER PUBLICATIONS

Pinkney et al. "Resolution Dependent GAN Interpolation for Controllable Image Synthesis Between Domains", arXiv:2010.05334v3 (Year: 2020).*

Richardson et al. "Encoding in Style: a StyleGAN Encoder for Image-to-Image Translation", arXiv:2008.00951v2, Apr. 21, 2021 (Year: 2021).*

Karras et al. "Training Generative Adversarial Networks with Limited Data", arXiv:2006.06676v2 (Year: 2020).*

International Search Report in Application No. PCT/CN2022/132131 mailed Jan. 28, 2023.

Office Action and Search Report of Russian application No. 2024115395 issued on Dec. 3, 2024.

Extended European search report of counterpart European application No. 22894809.7 issued on Jan. 15, 2025.

Jihye Back, Fine-Tuning StyleGAN2 For Cartoon Face Generation, arxiv.org, Cornell University Library, 201 Olin Library Cornell University Ithaca, NY14853, Jun. 22, 2021, the whole document.

Song Guoxian GUOXIAN001@E NTU EDU SG et al., AgileGAN: Stylizing Portraits by Inversion-Consistent Transfer Learning, ACM Transactions on Graphics, ACM, NY, US, vol. 40, No. 4, Jul. 19, 2021, pp. 1-13, ISSN: 0730-0301, DOI: 10.1145/3450626.3459771, the whole document.

Jang Wonjong Wonjong@Postech AC KR et al., StyleCariGAN: Caricature Generation via StyleGAN Feature Map Modulation, ACM Transactions on Graphics, ACM, NY, US, vol. 40, No. 4, Jul. 19, 2021, pp. 1-16, ISSN: 0730-0301, DOI :10.1145/3450626.3459860, the whole document.

* cited by examiner

METHOD AND ELECTRONIC DEVICE FOR CONSTRUCTING CARTOONIZATION MODELS, STORAGE MEDIUM, AND PROGRAM PRODUCT

This application is U.S. national stage of international application No. PCT/CN2022/132131, filed on Nov. 16, 2022, which claims priority to Chinese Patent Application No. 202111356773.X, filed on Nov. 16, 2021, the disclosures which are herein incorporated by reference in their entireties.

TECHNICAL FIELD

The present disclosure relates to the field of image processing technologies, and in particular, relates to a method for constructing cartoonization models, an electronic device for constructing cartoonization models, a computer-readable storage medium, and a computer program product.

BACKGROUND

Image cartoonization technology is one of the common tasks during image editing in computer vision and has widespread applications in daily life and entertainment. For instance, in film production, animation production, short videos, live streaming, and other scenarios, images are subjected to the cartoonization process.

SUMMARY

The present disclosure provides a method for constructing cartoonization models, an electronic device for constructing cartoonization models, a storage medium, and a program product.

According to some embodiments of the present disclosure, a method for constructing cartoonization models is provided. The method includes:

- generating a predetermined number of sample authentic images using a pre-trained first generative model;
- constructing a second generative model based on the first generative model, and generating a sample cartoon image corresponding to each of the sample authentic images using the second generative model;
- acquiring a sample image pair by combining the each of the sample authentic images with the corresponding sample cartoon image; and
- generating a cartoonization model for converting a target image into a fully cartoonized image by fitting, based on a sample set consisting of multiple sample image pairs, a predetermined initial cartoonization model with a weight corresponding to the second generative model as an initial weight.

According to some embodiments of the present disclosure, an electronic device for constructing cartoonization models is further provided. The electronic device includes:

- one or more processors; and
- a storage apparatus, configured to store one or more programs,
- wherein the one or more processors, when loading and running the one or more programs, are caused to perform the method as described above.

According to some embodiments of the present disclosure, non-transitory computer-readable storage medium storing a computer program is further provided, wherein the program, when loaded and run by a processor, causes the processor to perform the method as described above.

According to some embodiments of the present disclosure, a computer program product including one or more computer-executable instructions is further provided. The one or more computer-executable instructions, when loaded and executed by a processor, cause the processor to perform the method as described above.

DETAILED DESCRIPTION

In related art, the implementation methods of image cartoonization process are as follows. One of the processing methods is based on the basic signal, which primarily includes constructing a material library, matching the most suitable materials from the material library based on various relevant basic signals, such as height, body size, hair color, and clothing color, and then assemble these matched materials into an animated character. However, this method has several drawbacks, such as unvaried images, lack of flexibility, insufficient diversity, and poor resemblance of users' features.

Another processing method is based on texture mapping and facial editing. This method transforms a real person's facial shape into a facial shape of an animated character through deformation, and then performs texturing with various materials, such as the faces, eyes, and eyebrows of animated characters, to achieve image cartoonization. However, this method results in unvaried effects, with the constructed cartoonized images of different characters looking similar and lacking diversity. Moreover, the sense of being cartoonish is weak, and the authenticity is poor.

Figure 1:
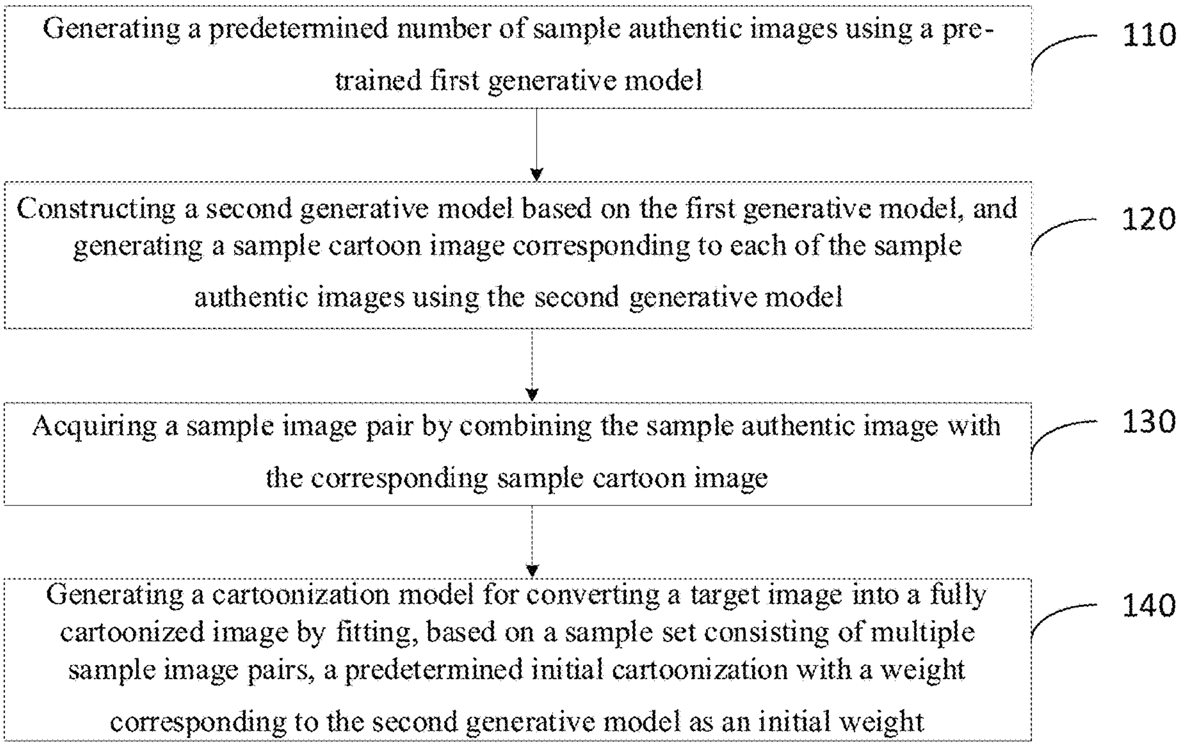
FIG. 1 is a flowchart of a method embodiment for constructing cartoonization models according to some embodiments of the present disclosure.

FIG. 1 is a flowchart of a method embodiment for constructing cartoonization models according to some embodiments of the present disclosure. In some embodiments, the method is implemented via an apparatus for constructing cartoonization models. In some embodiments, the apparatus for constructing cartoonization models is disposed in a server or a client, which is not limited in the embodiments. The method aims to avoid cases in related art such as the generated cartoon images by the cartoonization process being unvaried, lacking flexibility, being insufficient in diversity, having poor resemblance of users' features, and having a weak sense of cartoonishness.

Figure 2:
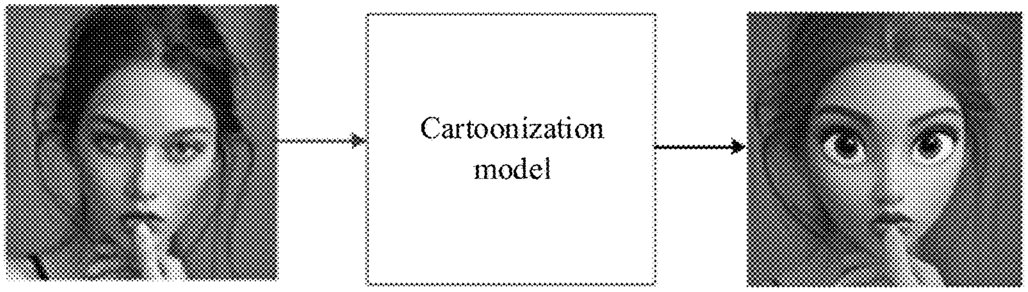
FIG. 2 is a schematic diagram illustrating the effect of a full-image cartoonization processing for an image based on a cartoonization model according to some embodiments of the present disclosure.

The cartoonization model constructed according to the embodiments is applicable in scenarios such as image processing, short videos, film production, live streaming, and 3D cartoons, and is used to convert an image from scenarios like image processing, short videos, movies, and live streaming into a fully cartoonized image. In some embodiments, as shown in FIG. 2, an image is given and input into the cartoonization model, and the cartoonization model outputs an image that is fully cartoonized (i.e., a fully cartoonized image). The content of the fully cartoonized image remains the same as the input image, but the style is changed into a cartoon style, that is, all elements in the input image are cartoonized. In other embodiments, a short video is given, each frame of the short video is input into the cartoonization model, and then the cartoonization model outputs fully cartoonized images corresponding to multiple frames, thereby achieving the full-image cartoonization of each frame in the input short video.

In some embodiments, the cartoonization model constructed according to the embodiments is integrated into apps or web pages according to the development documentation.

As shown in FIG. 1, the embodiments include the following processes.

In process 110, a predetermined number of sample authentic images are generated using a pre-trained first generative model.

Generative models are an important class of models in probability statistics and machine learning, which refer to models used for randomly generating observable data. In some embodiments, the first generative model is a StyleGAN2 model and a predetermined number of sample authentic images are randomly generated by the StyleGAN2 model. Here, sample authentic images refer to images that are not cartoonized, such as images containing a real person.

Generative adversarial networks (GAN) are a type of deep learning model and are a type of generative model that is capable of generating new content. StyleGAN is one type of GAN, and is a style-based generative model. StyleGAN is an advanced high-resolution image synthesis method that is proven to reliably work across various datasets. In addition to realistic portraits, StyleGAN is used to generate other animals, cars, and even rooms. However, StyleGAN is not perfect; the most noticeable flaw of StyleGAN is that the generated images sometimes contain speckle-like artifacts. This flaw is overcome by StyleGAN2, thereby improving the quality of the generated images.

Figure 3:
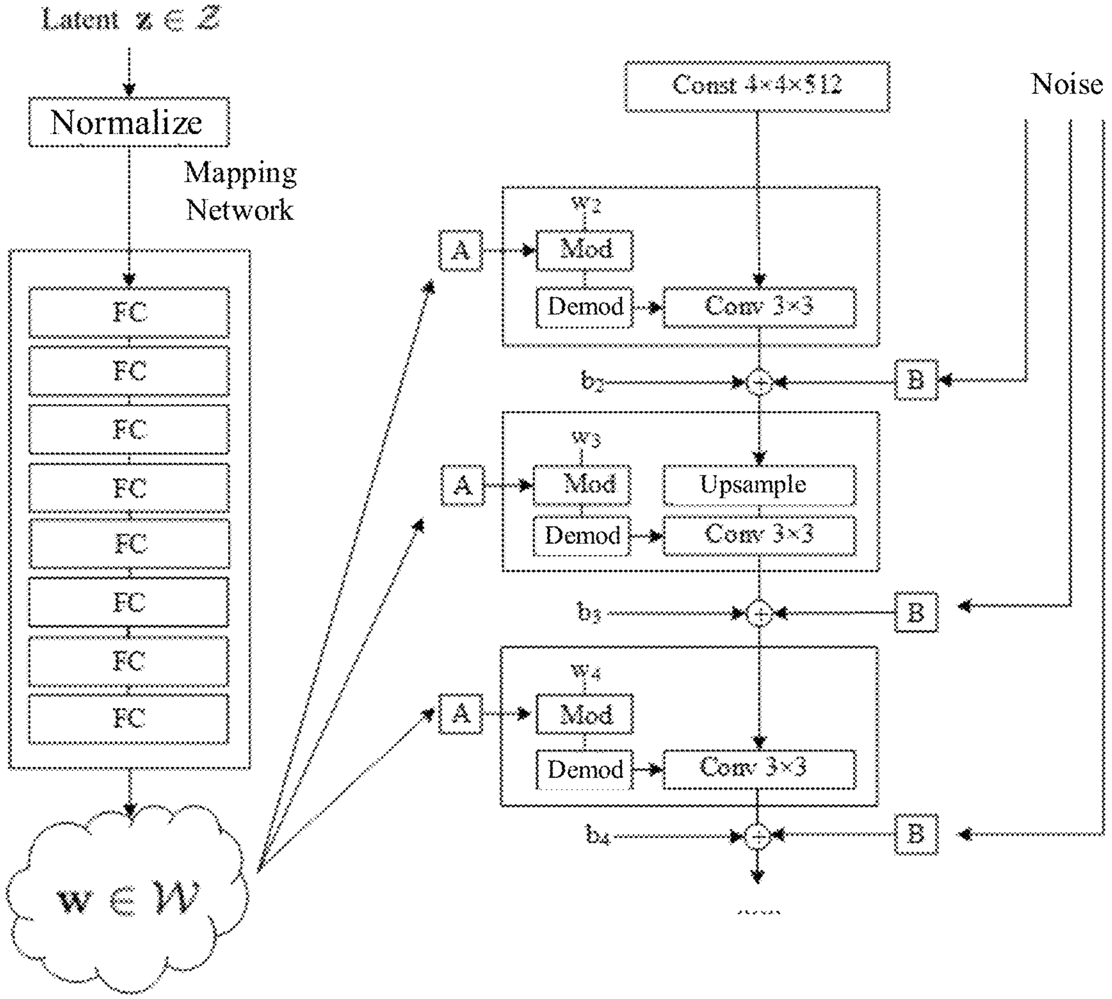
FIG. 3 is a schematic diagram of a model architecture of a StyleGAN2 model according to some embodiments of the present disclosure.

FIG. 3 illustrates the model architecture of the StyleGAN2 model. StyleGAN2 consists of two parts, including the mapping network on the left side and the synthesis network on the right side, as shown in FIG. 3.

The mapping network can better disentangle the input. As shown in FIG. 3, the mapping network is composed of eight fully connected layers (FC) with Gaussian noise (latent Z) as the input, and a latent variable (W) is acquired through the mapping network.

The synthesis network is composed of modules including learnable affine transformation (A), modulation-demodulation module (Mod-Demod), upsampling (Upsample), and other modules. In addition to these modules, the synthesis network further includes a weight (w), a bias (b), and a constant input (c, i.e., Const 4*4*512, representing a learnable constant). The activation function (Leaky ReLU) is always applied immediately upon adding a bias.

In some embodiments, the learnable affine transformation (A) is composed of a fully connected layer. In some embodiments, the Upsample performs an upsampling operation through deconvolution (also referred to as transpose convolution).

The processing flow of the modulation-demodulation module (Mod-Demod) is as follows:

$$w'_{ijk} = s_i \cdot w_{ijk}.$$

where $s_i$ represents the scaling factor of the i-th input feature map.

Upon scaling and convolution, the weight of the convolutional layer is demodulated, and the standard deviation of the output activation is as follows:

$$\sigma_j = \sqrt{\Sigma_{i,k} w'_{ijk}}.$$

Demodulating the weight aims to restore the output to the unit standard deviation, that is, the new weight of the convolutional layer is as follows:

$$w''_{ijk} = w'_{ijk} / \sqrt{\Sigma_{i,k} {w'}^2_{ijk} + \epsilon}.$$

In the above formula, adding E is to avoid a denominator of zero.

On the rightmost in FIG. 3, random noise injection is shown. B represents a learnable noise parameter. random noise is introduced to make the generated images more realistic. In some embodiments, these noises generate subtle features on human faces during the generation, such as facial speckles.

In process 120, a second generative model is constructed based on the first generative model, and a sample cartoon image corresponding to each of the sample authentic images is generated using the second generative model.

In this process, the second generative model is also a StyleGAN2 model in some embodiments. The model architecture of the first generative model and the second generative model is the same, except that the training targets are different, resulting in different weights for the models. The training model of the first generative model is to generate sample authentic images, i.e., un-cartoonized images. The training model of the second generative model is to generate sample cartoon images, i.e., cartoonized images.

In some embodiments, a second generative model configured for cartoonization is acquired by fine-tuning the weight of the pre-trained first generative model with cartoon data as the training target. Subsequently, the second generative model is used to generate a sample cartoon image corresponding to each of the sample authentic images.

In process 130, a sample image pair is acquired by combining the sample authentic image with the corresponding sample cartoon image.

In this process, in the case that a predetermined number of sample authentic images and their corresponding sample cartoon images are generated, a sample image pair (picture to picture, P2P) is acquired based on each sample authentic image with its corresponding sample cartoon image. All of the sample image pairs constitute a sample set for subsequent model fitting.

It should be noted that, in some embodiments, the predetermined number is an empirical value, and a specific value of the predetermined number is determined according to the required precision of the model. In some embodiments, the predetermined number is 150,000, i.e., generating 150,000 sample image pairs.

In process 140, a cartoonization model for converting a target image into a fully cartoonized image is generated by fitting, based on a sample set consisting of the multiple sample image pairs, a predetermined initial cartoonization model with a weight corresponding to the second generative model as an initial weight.

In this process, upon acquiring the sample set consisting of sample image pairs, a fitted cartoonization model is acquired by fitting the predetermined initial cartoonization model by using the sample authentic images in the sample set as training data, the weight corresponding to the final generated second generative model as the initial weight, and the sample cartoon image corresponding to each of the sample authentic images as the optimization target. The cartoonization model is configured to convert a target image into a fully cartoonized image.

In the embodiments, when constructing the cartoonization model for converting a target image into a fully cartoonized image, a predetermined number of sample authentic images is first randomly generated using a pre-trained first generative model, a second generative model for generating sample cartoon images is subsequently constructed based on the first generative model, and then a sample cartoon image corresponding to each of the sample authentic images is generated using the second generative model. Further, a sample set is acquired by acquiring a sample image pair by combining the sample authentic image with its corresponding sample cartoon image, and then the predetermined initial cartoonization model is fitted using the sample set with the weight corresponding to the second generative model as the initial weight. The fitted model is the cartoonization model, which can achieve full-image cartoonization processing. In the embodiments, the second generative model is associated with the first generative model, and the weight of the second generative model serves as the initial weight for the cartoonization model; and the cartoonization model is fitted with the training data being image pairs acquired by pairing images, which allow the acquired cartoonization model to possess better robustness and generalization performance and improve the effect of full-image cartoonization. In addition, the embodiments require less data relative to other solutions.

Figure 4:
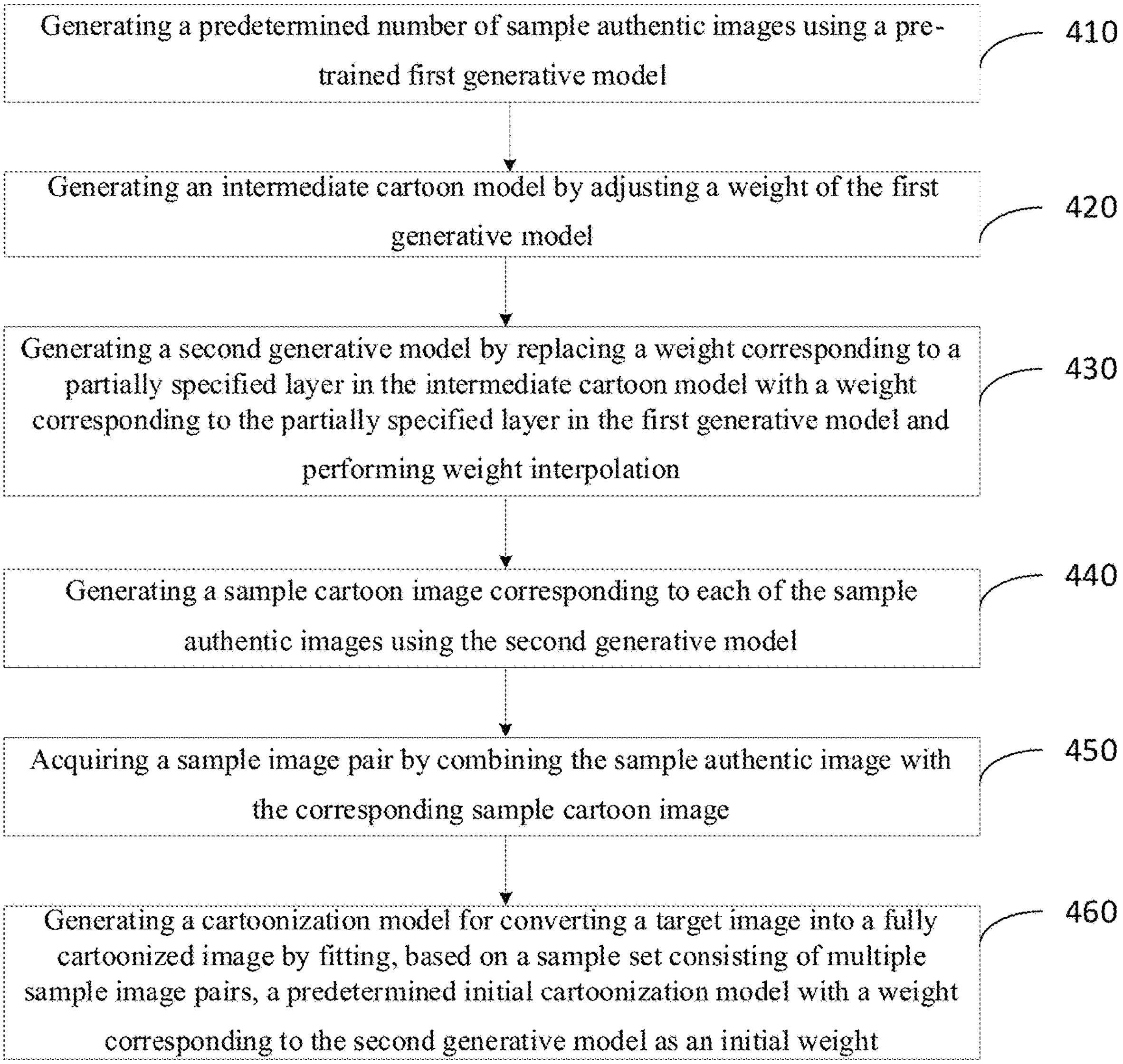
FIG. 4 is a flowchart of a method embodiment for constructing cartoonization models according to some embodiments of the present disclosure.

FIG. 4 is a flowchart of a method embodiment for constructing cartoonization models according to some embodiments of the present disclosure. The embodiments, based on the previous embodiments, provide a more detailed explanation of the process for constructing the second generative model. As shown in FIG. 4, the embodiments include the following processes.

In process 410, a predetermined number of sample authentic images are generated using a pre-trained first generative model.

In process 420, an intermediate cartoon model is generated by adjusting a weight of the first generative model.

In the embodiments, the training target of the first generative model is the original un-cartoonized images, the training target of the intermediate cartoon model is the cartoon images that are cartoonized. Therefore, the intermediate cartoon model is generated by using the weight of the first generative model as the initial weight for the intermediate cartoon model and taking the cartoon images as the training target. In this way, the weight of the intermediate cartoon model is acquired by adjusting the weight of the first generative model.

In process 430, a second generative model is generated by replacing a weight corresponding to a partially specified layer in the intermediate cartoon model with a weight corresponding to the partially specified layer in the first generative model and performing weight interpolation.

To ensure that some specific attributes of the final output cartoon images remain consistent with some specific attributes of the original images generated by the first generative model, upon the intermediate cartoon model being generated, the weight corresponding to a partially specified layer in the intermediate cartoon model is replaced with the weight corresponding to the partially specified layer in the first generative model, and weight interpolation is performed to generate the second generative model.

In some embodiments, the partially specified layer includes at least one of: the layer controlling the pose of a character or the layer controlling the skin color of a character. In other words, to ensure that the pose and the skin color of the cartoonized character remain consistent with the pose and the skin color of the real person in the original image, upon acquiring the intermediate cartoon model, the weights of the layer controlling the pose of the character and the layer controlling the skin color of the character in the intermediate cartoon model is replaced with the weights of the layer controlling the pose of the character and the layer controlling the skin color of the character in the first generative model, and weight interpolation is performed within the intermediate cartoon model to finally acquire the weight of the second generative model.

Weight interpolation refers to the process of calculating a new weight between two weights using an interpolation algorithm and inserting the new weight between the two weights. The embodiments do limit the specific interpolation algorithm for weight interpolation. In some embodiments, the interpolation algorithm includes the inverse distance weighted (IDW) interpolation method for weight interpolation. Inverse distance weighted interpolation is also referred to as the inverse distance to a power method, which means that the inverse distance to a power grid method is a weighted average interpolation method that can perform interpolation exactly or smoothly. Inverse distance weighted (IDW) interpolation explicitly assumes that objects closer to each other are more similar than objects farther from each other. When predicting values for any unmeasured location, the IDW method uses the measured values around the prediction location. Compared to the measured values farther from the prediction location, the measured values closest to the prediction location have a greater impact on the predicted value. The IDW method assumes that each measurement point has a local influence that decreases as the distance increases. Because this method assigns greater weight to points nearest to the prediction location, and the weight decreases as a function of distance, the method is referred to as the inverse distance weighted (IDW) method.

In addition, those skilled in the art can also use a covariance-based weight interpolation algorithm, Kriging interpolation method, etc., to perform weight interpolation.

In process 440, a sample cartoon image corresponding to each of the sample authentic images is generated using the second generative model.

In process 450, a sample image pair is acquired by combining the sample authentic image with the corresponding sample cartoon image.

In process 460, a cartoonization model for converting a target image into a fully cartoonized image is generated by fitting, based on a sample set consisting of multiple sample image pairs, a predetermined initial cartoonization model with a weight corresponding to the second generative model as an initial weight.

In the embodiments, when constructing the second generative model, an intermediate cartoon model is acquired, based on the pre-trained first generative model, by adjusting the weight of the first generative model by taking cartoon images as the training target, and then the final weight of the second generative model is acquired by performing weight replacement and weight interpolation on partial layers of the intermediate cartoon model, thereby completing the construction of the second generative model. Compared with training the second generative model by solely taking cartoonized images as the training target, the second generative model constructed through the above method in the embodiments has higher robustness and improves the authenticity of cartoonized images.

Figure 5:
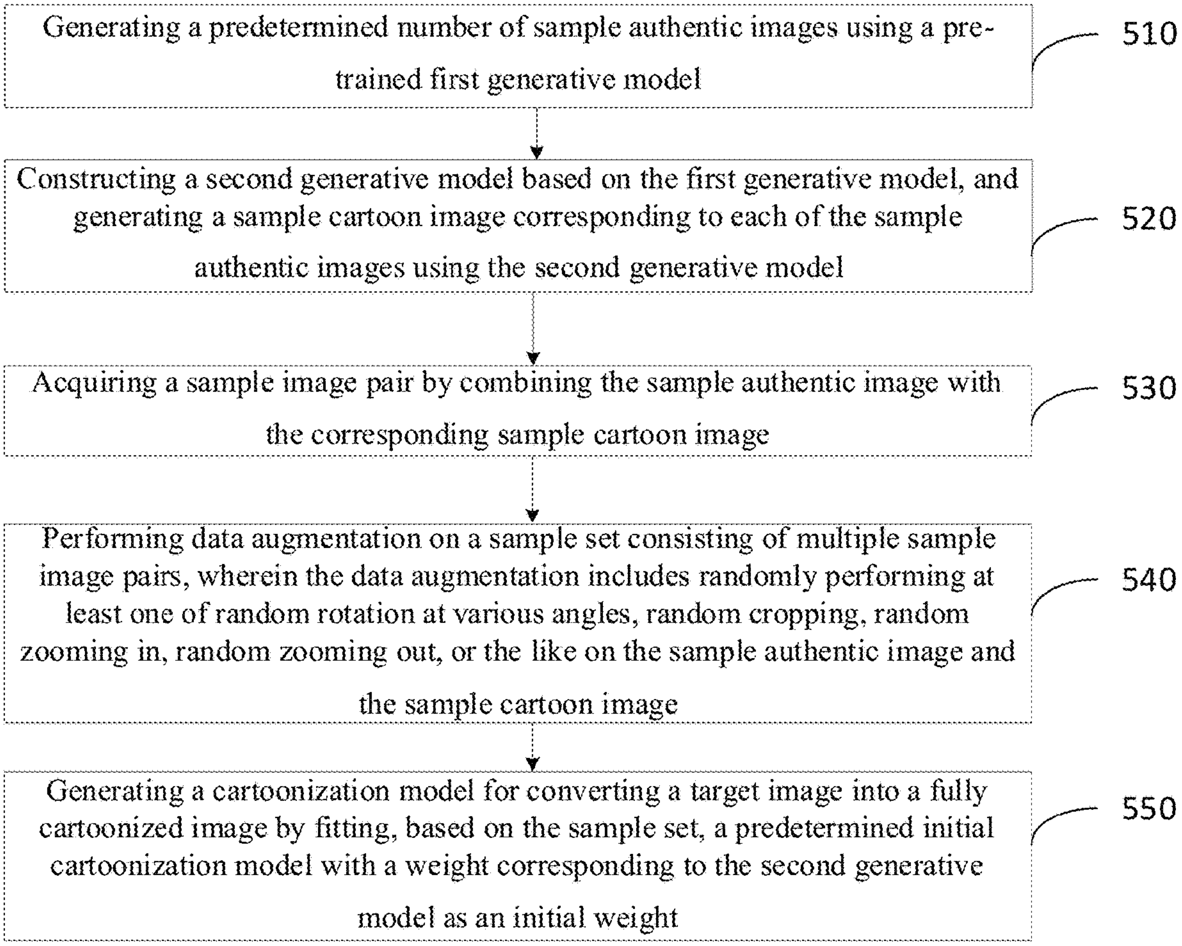
FIG. 5 is a flowchart of a method embodiment for constructing cartoonization models according to some embodiments of the present disclosure.

FIG. 5 is a flowchart of a method embodiment for constructing cartoonization models according to some embodiments of the present disclosure. The embodiments, based on the previous embodiments, provide a more detailed explanation of the process for handling training samples. As shown in FIG. 5, the embodiments include the following processes.

In process 510, a predetermined number of sample authentic images are generated using a pre-trained first generative model.

In process 520, a second generative model is constructed based on the first generative model, and a sample cartoon image corresponding to each of the sample authentic images is generated using the second generative model.

In process 530, a sample image pair is acquired by combining the sample authentic image with the corresponding sample cartoon image.

In process 540, data augmentation is performed on a sample set consisting of multiple sample image pairs. The data enhancement includes: randomly performing at least one of random rotation, random cropping, random zooming in, random zooming out, or the like on the sample authentic image and the sample cartoon image.

In this process, all sample image pairs are combined to form the sample set, and data augmentation is applied to the sample authentic images and the sample cartoon images in the sample set to increase the volume of training data and enhance the robustness and generalization capability of the model.

In implementation in some embodiments, data augmentation includes at least one of the following methods: various noise augmentation, augmentation through downsampling and then upsampling, data augmentation for sample image pairs, and so on.

In some embodiments, data augmentation for sample image pairs includes, but is not limited to, randomly performing random rotation, random cropping, random zooming in, random zooming out, or the like on the sample authentic images and/or sample cartoon images.

In process 550, a cartoonization model for converting a target image into a fully cartoonized image by fitting, based on the sample set, a predetermined initial cartoonization model with the weight corresponding to the second generative model as the initial weight.

In some embodiments, upon acquiring the sample set through data augmentation, the cartoonization model is generated by fitting, based on the sample set, the predetermined initial cartoonization model with the weight corresponding to the second generative model as the initial weight.

In the embodiments, upon acquiring the sample image pairs acquired by combining the sample authentic images with the corresponding sample cartoon images, the sample image pairs are used as training data to form a sample set. Then, various methods of data augmentation are performed on the sample set, and the sample set upon data augmentation is used to train the cartoonization model, thereby achieving the full-image cartoonization technology. In this way, the robustness of the cartoonization model is enhanced, thereby ensuring that the model has better robustness to objects (such as human objects) at arbitrary angles and strong generalization performance under various scenarios, and still maintaining good full-image cartoonization effects for various low-quality images.

Figure 6:
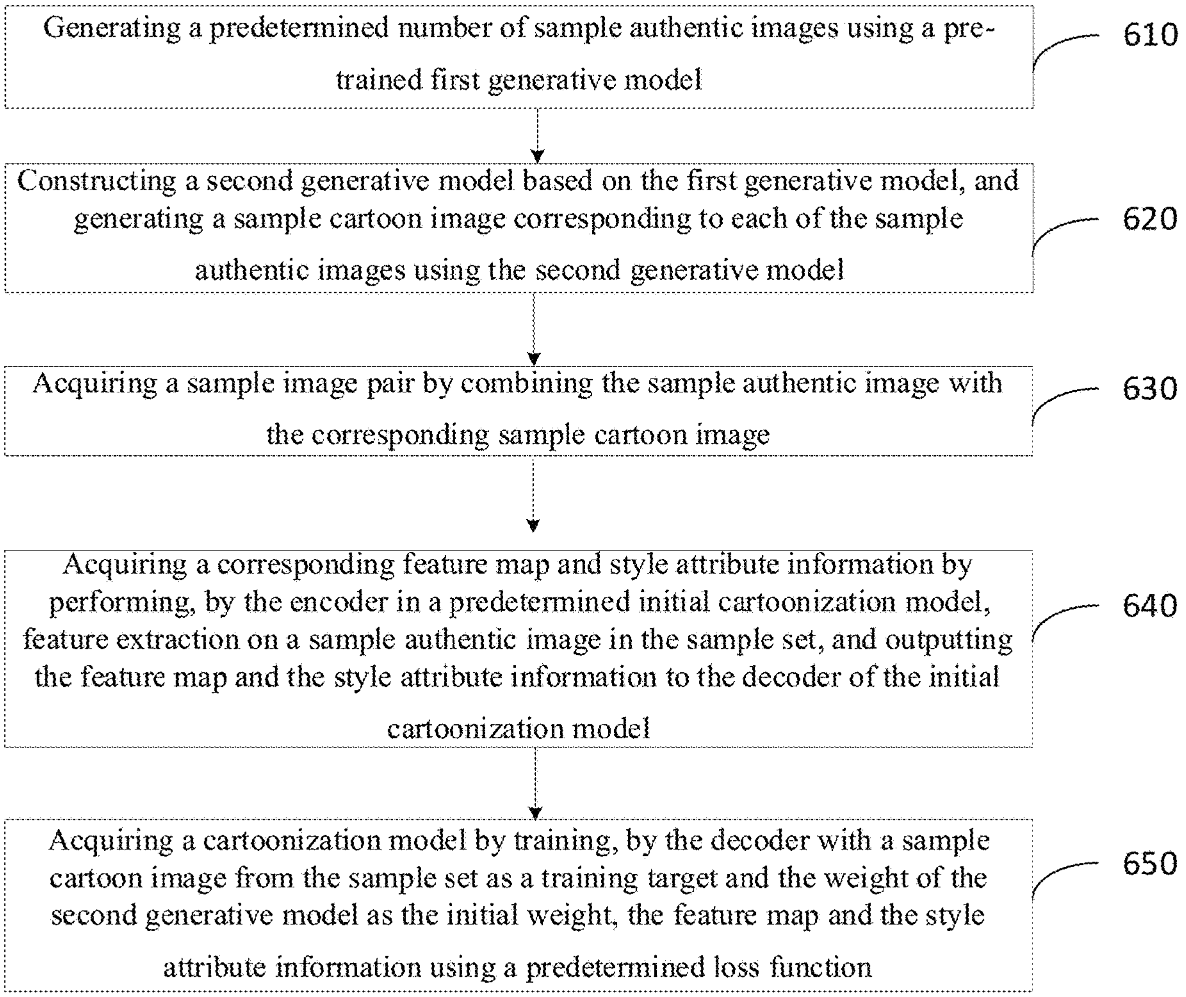
FIG. 6 is a flowchart of a method embodiment for constructing cartoonization models according to some embodiments of the present disclosure.

FIG. 6 is a flowchart of a method embodiment for constructing cartoonization models according to some embodiments of the present disclosure. The embodiments, based on the previous embodiments, provide a more detailed explanation of the process for constructing the cartoonization model. As shown in FIG. 6, the embodiments include the following processes.

In process 610, a predetermined number of sample authentic images are generated using a pre-trained first generative model.

In process 620, a second generative model is constructed based on the first generative model, and a sample cartoon image corresponding to each of the sample authentic images is generated using the second generative model.

In process 630, a sample image pair is acquired by combining the sample authentic image with the corresponding sample cartoon image.

In process 640, a corresponding feature map and style attribute information are acquired by performing, by the encoder in a predetermined initial cartoonization model, feature extraction on a sample authentic image in the sample set, and the feature map and the style attribute information are output to the decoder in the initial cartoonization model.

Figure 7:
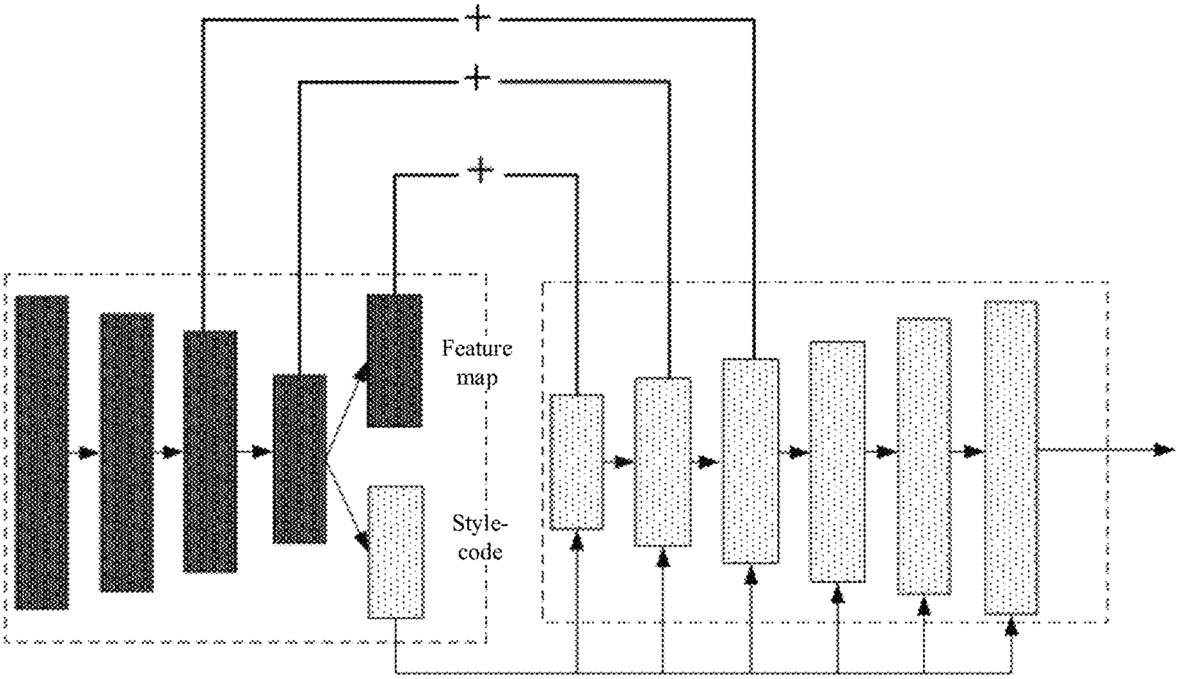
FIG. 7 is a schematic diagram illustrating the architecture of an initial cartoonization model according to some embodiments of the present disclosure.

In some embodiments, the initial cartoonization model includes an encoder and a decoder. As shown in FIG. 7, the left dashed box shows the encoder and the right dashed box shows the decoder. The encoder serves to extract information from multiple sample authentic images and output the extracted feature map and style attribute information to the decoder. The decoder then combines the feature map and the style attribute information to output the fully cartoonized image.

In the embodiments, the initial weight of the encoder is the weight of an encoder in which various real person images are edited previously.

In some embodiments, the encoder includes an input layer, several residual layers, and a fully connected layer. The multiple residual layers are configured to extract a feature map from a sample authentic image and output the feature map to a corresponding layer of the decoder; and the fully connected layer is configured to extract style attribute information from the sample authentic image and output the style attribute information to multiple layers of the decoder.

In some embodiments, the structure of the encoder is shown in Table 1 below. In Table 1, there are five residual layers (ResBlock), and the size of the feature map (Feature-map) output by each residual layer is designated, such as, as shown in Table 1, 512*512*3, 256*256*32, etc. The fully connected layer FC outputs style attribute information of a size of 16*512.

TABLE 1

| Encoder | |
|---|---|
| Input, 512*512*3 | |
| ResBlock, 256*256*32 | |
| ResBlock, 128*128*128 | |
| ResBlock, 64*64*256 | |
| ResBlock, 32*32*512 | |
| ResBlock 16*16*512 | FC (16*512) |
| Featuremap | Latend code |

As shown in FIG. 7, the feature map extracted by each residual layer is, on one hand, output to the next layer for processing, and on the other hand, the feature map also needs to be output to the corresponding layer in the decoder (except for the last residual layer, which only outputs results to the corresponding layer in the decoder). Here, the corresponding layer refers to the decoding layer that matches the size of the current output feature map. In some embodiments, in the case that the size of the current output feature map is 32*32*512, then the corresponding layer in the decoder refers to the decoding layer that is able to process feature maps with the size of 32*32*512.

In FIG. 7, there are two output layers on the rightmost side of the encoder, the one located at the top is the last residual layer (ResBlock), which outputs a feature map of size 16*16*512; and the one located at the bottom is the FC layer, which outputs style attribute information of size 16*512. The FC layer outputs the style attribute information to each layer in the decoder, such that the decoder can perform the full-image cartoonization processing based on the style attribute information.

In process 650, the cartoonization model is acquired by training, by the decoder with a sample cartoon image in the sample set as the training target and the weight of the second generative model as the initial weight, the feature map and the style attribute information using a predetermined loss function.

In some embodiments, the decoder has the same structure as the synthesis network of the second generative model StyleGAN2, and the weight of the second generative model is used as the initial weight for training.

As shown in FIG. 7, each decoding layer of the decoder, upon acquiring the input feature map and the style attribute information from the encoder, decodes and synthesizes the feature map and the style attribute information, and outputs the decoding result to the next layer. This process continues until the last decoding layer outputs the fully cartoonized result.

In some embodiments, the loss function used for training the cartoonization model includes a combination of: an adversarial network loss function $GAN_{loss}$, a perceptual loss function $perceptual_{loss}$, and a regression loss function $L1_{loss}$, that is:

$$\text{Loss} = GAN_{loss} + \text{perceptual}_{loss} + L1_{loss};$$

wherein the adversarial network loss function $GAN_{loss}$ is a type of classification loss function configured to determine the authenticity of the fully cartoonized image generated by the cartoonization model, and calculate a loss based on a result of the determination, thereby making the cartoonish sense of the fully cartoonized image generated by the cartoonization model more realistic.

In some embodiments, $GAN_{loss}$ is calculated using the following formula:

$$GAN_{loss} = E\left[D(G(x) - 1)^2\right] + E\left[D(G(x))^2\right];$$

wherein D represents the discriminator, E represents the mean value, and G (x) represents the fully cartoonized image output by the cartoonization model.

The perceptual loss function $perceptual_{loss}$ is configured to separately input the fully cartoonized image output by the cartoonization model and a corresponding sample cartoon image in the sample set into a predetermined neural network model to acquire a corresponding first feature map and second feature map output by the neural network model, and calculate the L2 loss (least squared error) between the first feature map and the second feature map.

In some embodiments, the predetermined neural network model is a VGG model, such as VGG-19 or VGG-16.

In some embodiments, $perceptual_{loss}$ is calculated using the following formula:

$$\text{perceptual}_{loss} = E\left((VGG(x) - VGG(G(x)))^2\right);$$

wherein E represents the mean value, G (x) represents the fully cartoonized image output by the cartoonization model, and x represents the sample cartoon image, corresponding to the sample original image, input to the cartoonization model.

$L1_{loss}$ is configured to calculate the L1 loss between the fully cartoonized image output by the cartoonization model and the corresponding sample cartoon image in the sample set, which is represented using the following formula:

$$L1_{loss} = E(x - G(x))$$

It should be noted that in the embodiments, in addition to the combination of the three loss functions listed above, the design of the loss function can also adopt other loss functions depending on the actual optimization targets, which is not limited in the embodiments.

In the embodiments, the initial cartoonization model includes an encoder and a decoder. When fitting the initial cartoonization model, the initial weight of the encoder is the weight of an encoder in which various real person images are edited previously, and the initial weight of the decoder is the weight of the second generative model. By adopting the aforementioned model architecture, taking paired data of sample authentic image and sample cartoon image as training data and fitting the cartoonization model based on the combination of the three loss functions, namely, the adversarial network loss function $GAN_{loss}$, the perceptual loss function $perceptual_{loss}$, and the regression loss function $L1_{loss}$, the fitted cartoonization model can effectively extract the feature map and sample attribute information from images by the encoder, and perform full-image cartoonization processing on the feature map and the sample attribute information by the decoder. In this way, the cartoonish sense of the fully cartoonized images output by the cartoonization model is enhanced, and the fully cartoonized content is more consistent with the real images, thereby effectively improving the robustness and generalization capability of the cartoonization model, and making the cartoonization model applicable to low-quality images and complex scenarios.

Figure 8:
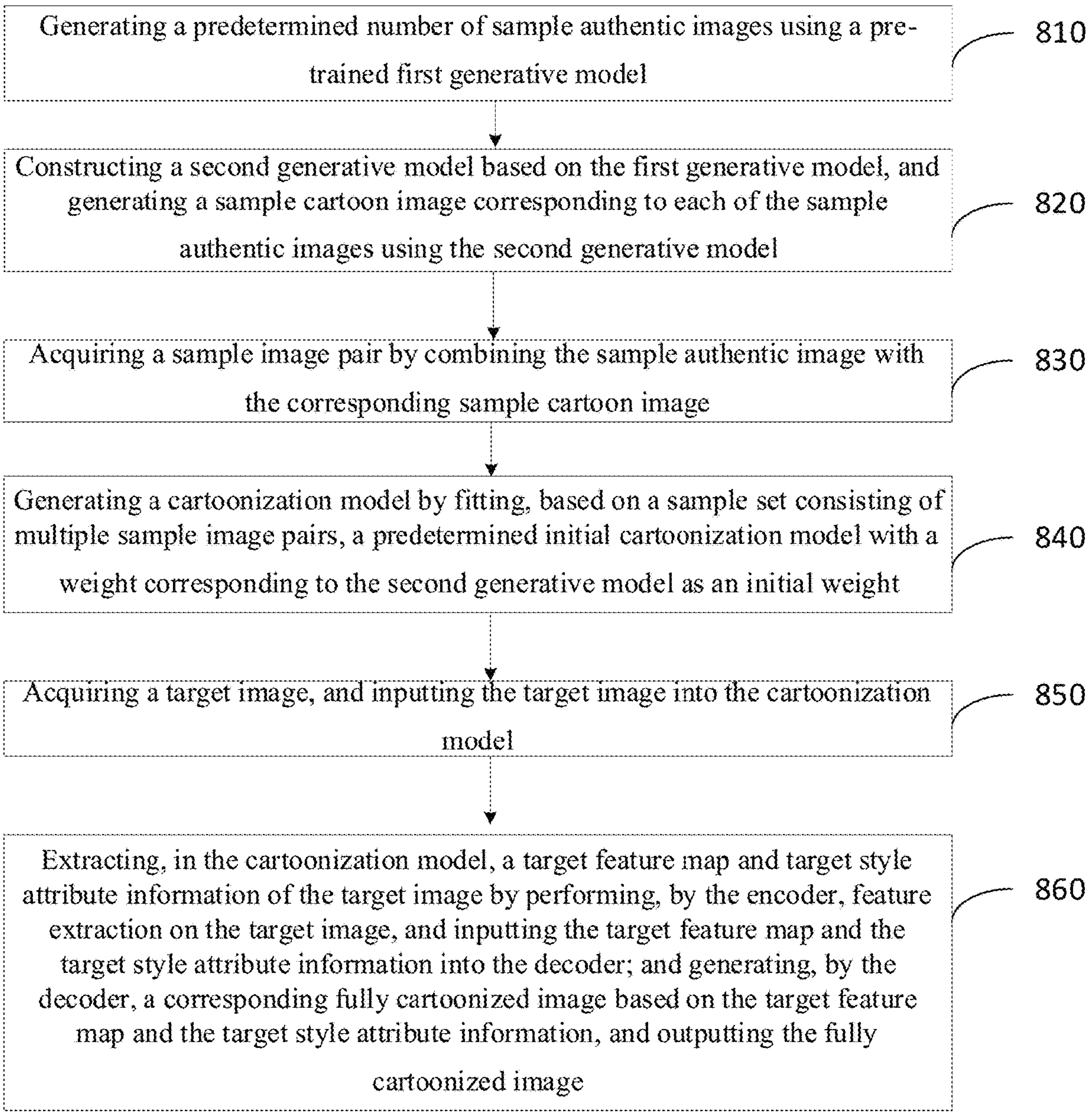
FIG. 8 is a flowchart of a method embodiment for constructing cartoonization models according to some embodiments of the present disclosure.

FIG. 8 is a flowchart of a method embodiment for constructing cartoonization models according to some embodiments of the present disclosure. The embodiments, based on the previous embodiments, provide a more detailed explanation of the inference process of the cartoonization model. As shown in FIG. 8, the embodiments include the following processes.

In process 810, a predetermined number of sample authentic images are generated using a pre-trained first generative model.

In process 820, a second generative model is constructed based on the first generative model, and a sample cartoon image corresponding to each of the sample authentic images is generated using the second generative model.

In process 830, a sample image pair is acquired by combining the sample authentic image with the corresponding sample cartoon image.

In process 840, a cartoonization model is acquired by fitting, based on a sample set consisting of multiple sample image pairs, a predetermined initial cartoonization model with a weight corresponding to the second generative model as an initial weight.

In process 850, a target image is acquired, and the target image is input into the cartoonization model.

In some embodiments, the target image includes an image input via an image editing page. In some embodiments, in the case that the image editing page, in an image editing application or an application with an image editing function, is opened, an image imported by a user is used as the target image. In the case that the user triggers the full-image cartoonization function in the image editing page, the full-image cartoonization technology of the present disclosure is used to perform the full-image cartoonization processing on the image.

In some embodiments, the target image further includes multiple image frames from a target video. In some embodiments, in a live streaming scenario, in the case that a user triggers the full-image cartoonization function in the live streaming interface, the full-image cartoonization technology of the present disclosure is used to perform the full-image cartoonization processing on the multiple image frames from the live video. In some embodiments, in a short video or video playing scenario, in the case that a user triggers the full-image cartoonization function in the playing interface, the full-image cartoonization technology of the present disclosure is used to perform the full-image cartoonization processing on the multiple image frames from the video.

In process 860, a target feature map and target style attribute information of the target image are extracted by performing, by the encoder in the cartoonization model, feature extraction on the target image, and the target feature map and the target style attribute information are input into the decoder; and a corresponding fully cartoonized image is generated by the decoder based on the target feature map and the target style attribute information, and the fully cartoonized image is output.

In the embodiments, in the case that the cartoonization model acquires the target image through the input layer of the encoder, the input layer inputs the target image into the first residual layer of the encoder as shown in FIG. 7. The first residual layer extracts the feature map of the target image, and inputs the feature map into the next residual layer and the corresponding layer of the decoder; then, the next residual layer continues to extract features. This process continues until the last residual layer and FC layer complete the processing, marking the completion of the encoder's operation. Then, the decoder starts to work. In each layer of the decoder, the cartoonization processing is performed based on the received target feature map and the target style attribute information, and the processed result is transmitted to the next layer for processing. This process continues until the last decoding layer outputs a fully cartoonized image to the output layer, and the output layer outputs the fully cartoonized image, marking the completion of the decoder's operation. Subsequently, the process proceeds to handle the next target image.

In the embodiments, the full-image cartoonization technology is achieved through the encoder and the decoder of the cartoonization model, which preserves the style of the authentic image, at the same time intensifies the cartoonization style of the whole image, ensures a realistic cartoonish sense, provides a high level of immersion, and is applicable to a variety of different cartoonization styles.

Figure 9:
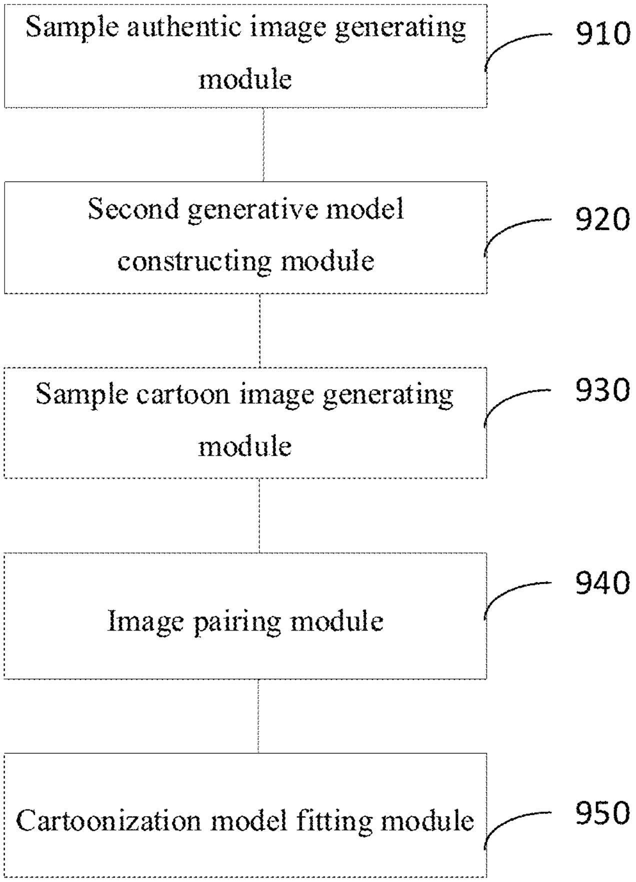
FIG. 9 is a structural block diagram of an apparatus embodiment for constructing cartoonization models according to some embodiments of the present disclosure.

FIG. 9 is a structural block diagram of an apparatus embodiment for constructing cartoonization models according to some embodiments of the present disclosure. The apparatus includes the following modules:

- a sample authentic image generating module 910, configured to generate a predetermined number of sample authentic images using a pre-trained first generative model;
- a second generative model constructing module 920, configured to construct a second generative model based on the first generative model;
- a sample cartoon image generating module 930, configured to generate a sample cartoon image corresponding to each of the sample authentic images using the second generative model;
- an image pairing module 940, configured to acquire a sample image pair by combining the sample authentic image with the corresponding sample cartoon image; and
- a cartoonization model fitting module 950, configured to generate a cartoonization model for converting a target image into a fully cartoonized image by fitting, based on a sample set consisting of multiple sample image pairs, a predetermined initial cartoonization model with a weight corresponding to the second generative model as an initial weight.

In some embodiments, the second generative model constructing module 920 is configured to:

- generate an intermediate cartoon model by adjusting the weight of the first generative model; and
- generate the second generative model by replacing a weight corresponding to a partially specified layer in the intermediate cartoon model with a weight corresponding to the partially specified layer of the first generative model, and performing weight interpolation.

In some embodiments, the partially specified layer includes at least one of: a layer controlling a pose of a character or a layer controlling skin color of a character.

In some embodiments, the initial cartoonization model includes an encoder and a decoder.

The cartoonization model fitting module 950 includes the following sub-modules:

an encoding sub-module, configured to acquire a corresponding feature map and style attribute information by performing, by the encoder, feature extraction on a sample authentic image in the sample set, and output the feature map and the style attribute information to the decoder; and a decoding sub-module, configured to acquire the cartoonization model by training, by the decoder with a sample cartoon image from the sample set as the training target and the weight of the second generative model as the initial weight, the feature map and the style attribute information using a predetermined loss function.

In some embodiments, the loss function includes a combination of: an adversarial network loss function, a perceptual loss function, and a regression loss function L1_loss.

The adversarial network loss function is configured to determine authenticity of the fully cartoonized image generated by the cartoonization model, and calculate a loss based on a result of the determination.

The perceptual loss function is configured to acquire a corresponding first feature map and second feature map output by a predetermined neural network model by separately inputting the fully cartoonized image output by the cartoonization model and a corresponding sample cartoon image in the sample set into the predetermined neural network model, and calculate an L2 loss between the first feature map and the second feature map.

The L1_loss is configured to calculate an L1 loss between the fully cartoonized image output by the cartoonization model and the corresponding sample cartoon image in the sample set.

In some embodiments, the encoder includes:

an input layer, multiple residual layers, and a fully connected layer, wherein the multiple residual layers are configured to extract the feature map from the sample authentic image and output the feature map to a corresponding layer of the decoder; and the fully connected layer is configured to extract the style attribute information from the sample authentic image and output the style attribute information to multiple layers of the decoder.

In some embodiments, an initial weight of the encoder is a weight of an encoder in which various real person images are edited previously.

In some embodiments, the second generative model is a StyleGAN2 model, and the decoder has a same structure as a synthetic network of the StyleGAN2 model.

In some embodiments, the apparatus further includes the following modules:

a target image acquiring module, configured to acquire the target image and input the target image into the cartoonization model; and a full-image cartoonization processing sub-module, configured to extract, in the cartoonization model, a target feature map and target style attribute information of the target image by performing, by the encoder, feature extraction on the target image, and input the target feature map and the target style attribute information into the decoder; and generate, by the decoder, a corresponding fully cartoonized image based on the target feature map and the target style attribute information, and output the fully cartoonized image.

In some embodiments, the target image includes at least one of:

an image input via an image editing page; or a plurality of image frames from a target video.

In some embodiments, the apparatus further includes the following modules:

a data augmenting module, configured to perform data augmentation on the sample set prior to model fitting using the sample set, wherein the data augmentation includes randomly performing at least one of random rotation, random cropping, random zooming in, random zooming out, or the like on the sample authentic images and the sample cartoon images.

The apparatus for constructing cartoonization models according to the embodiments of the present disclosure is capable of executing the method for constructing cartoonization models in the above embodiments of the present disclosure, and includes corresponding functional modules to execute the method and achieves corresponding beneficial effects.

Figure 10:
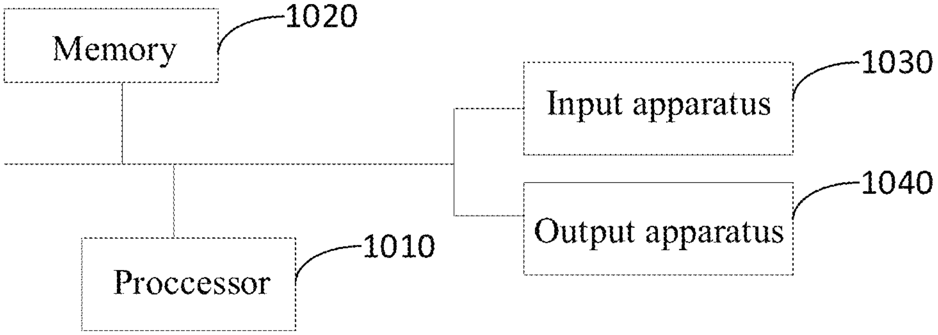
FIG. 10 is a structural schematic diagram of an electronic device according to some embodiments of the present disclosure.

FIG. 10 is a structural schematic diagram of an electronic device according to some embodiments of the present disclosure. As shown in FIG. 10, the electronic device includes a processor 1010, a memory 1020, an input apparatus 1030, and an output apparatus 1040. The number of processors 1010 in the electronic device is one or more, and by way of example, one processor 1010 is shown in FIG. 10. The processor 1010, the memory 1020, the input apparatus 1030, and the output apparatus 1040 in the electronic device is connected by a bus or other means, and by way of example, the processor 1010, the memory 1020, the input apparatus 1030, and the output apparatus 1040 are connected by a bus in FIG. 10.

The memory 1020, as a computer-readable storage medium, is configured to store software programs, computer-executable programs, and modules, such as the program instructions/modules corresponding to any embodiment in the above embodiments of the present disclosure. The processor 1010, when loading and executing the software programs, the instructions, or the modules stored in memory 1020, executes the various functional applications and data processing of the electronic device, thus performing the methods provided by any embodiment in the aforementioned method embodiments.

The memory 1020 mainly includes a program storage area and a data storage area. The program storage area stores an operating system and at least one application required for functionality; and the storage data area stores data generated based on terminal usage, or the like. Furthermore, the memory 1020 includes a high-speed random-access memory, and further includes a non-volatile memory, such as at least one magnetic disk memory device, flash memory device, or other non-volatile solid-state memory device. In some embodiments, the memory 1020 includes a memory that is remotely configured relative to the processor 1010, and the remote memory is connected to a device/terminal/server via networks. The above networks include, but are not limited to, the internet, intranet, local area network, mobile communication network, and combinations thereof.

The input apparatus 1030 is configured to receive input numerical or character information and produce key signal inputs related to user settings and function control of the electronic device. The output apparatus 1040 includes display devices such as a display screen.

The embodiments of the present disclosure further provide a storage medium storing one or more computer-executable instructions. The one or more computer-executable instructions, when loaded and executed by a processor of a computer, cause the computer to perform the method provided by any embodiment in the above method embodiments. In some embodiments, the computer-readable storage medium is a non-transitory computer-readable storage medium.

In addition, in the storage medium storing the one or more computer-executable instructions provided by the embodiments of the present disclosure, the one or more computer-executable instructions are not limited to the method operations described above, but can also be used to perform related operations in the method provided by any embodiment of the present disclosure.

The embodiments of the present disclosure further provide a computer program product including one or more computer-executable instructions. The one or more computer-executable instructions, when loaded and executed by a processor of a computer, cause the computer to perform the method as defined in any one of the above embodiments.

In addition, in the computer program product provided by the embodiments of the present disclosure, the one or more computer-executable instructions are not limited to the method operations described above, but can also be used to perform related operations in the method provided by any one of the embodiments of the present disclosure.

Based on the above description of the embodiments, those skilled in the art can clearly understand that the present disclosure can be implemented through software and necessary general-purpose hardware, or be implemented through hardware. Based on such understanding, the technical solutions of the present disclosure, or the parts that contribute to the related art may be substantially embodied in the form of a software product. In some embodiments, the computer software product is stored in a computer-readable storage medium, such as a floppy disk, a read-only memory (ROM), a random access memory (RAM), a flash memory (FLASH), a hard disk, or an optical disk of a computer, and include several instructions for enabling an electronic device (which is a personal computer, a server, or a network device) to perform the methods described in multiple embodiments of the present disclosure.

It should be noted that in the above apparatus embodiments, the multiple units and modules included are only divided according to functional logic, but are not limited to the above division as long as the corresponding functions can be achieved. In addition, the specific names of multiple functional units are used merely for easy differentiation and do not limit the protection scope of the present disclosure.

The invention claimed is:

1. A method for constructing cartoonization models, comprising:

generating a predetermined number of sample authentic images using a pre-trained first generative model;

constructing a second generative model based on the first generative model, and generating a sample cartoon image corresponding to each of the sample authentic images using the second generative model;

acquiring a sample image pair by combining the each of the sample authentic images with the corresponding sample cartoon image; and generating a cartoonization model for converting a target image into a fully cartoonized image by fitting, based on a sample set consisting of multiple sample image pairs, a predetermined initial cartoonization model with a weight corresponding to the second generative model as an initial weight;

wherein the initial cartoonization model comprises an encoder and a decoder; and generating the cartoonization model for converting the target image into the fully cartoonized image by fitting, based on the sample set consisting of the multiple sample image pairs, the predetermined initial cartoonization model with the weight corresponding to the second generative model as the initial weight comprises:

acquiring a corresponding feature map and style attribute information by performing, by the encoder, feature extraction on the sample authentic image in the sample set, and outputting the feature map and the style attribute information to the decoder, wherein an initial weight of the encoder is a weight of an encoder in which various real person images are edited previously; and acquiring the cartoonization model by training, by the decoder with the sample cartoon image in the sample set as a training target and the weight of the second generative model as the initial weight, the feature map and the style attribute information using a predetermined loss function.

2. The method according to claim 1, wherein constructing the second generative model based on the first generative model comprises:

generating an intermediate cartoon model by adjusting a weight of the first generative model; and generating the second generative model by replacing a weight corresponding to a partially specified layer in the intermediate cartoon model with a weight corresponding to the partially specified layer in the first generative model and performing weight interpolation.

3. The method according to claim 2, wherein the partially specified layer comprises at least one of: a layer controlling a pose of a character or a layer controlling skin color of a character.

4. The method according to claim 1, wherein the loss function comprises a combination of: an adversarial network loss function, a perceptual loss function, and a regression loss function L1 loss; wherein the adversarial network loss function is configured to determine authenticity of the fully cartoonized image generated by the cartoonization model, and calculate a loss based on a result of the determination;

the perceptual loss function is configured to acquire a corresponding first feature map and second feature map output by a predetermined neural network model by separately inputting the fully cartoonized image output by the cartoonization model and a corresponding sample cartoon image in the sample set into the predetermined neural network model, and calculate an L2 loss between the first feature map and the second feature map; and the regression loss function L1 loss is configured to calculate an L1 loss between the fully cartoonized image output by the cartoonization model and the corresponding sample cartoon image in the sample set.

5. The method according to claim 1, wherein the encoder comprises:

an input layer, multiple residual layers, and a fully connected layer, wherein the multiple residual layers are configured to extract the feature map from the sample authentic image and output the feature map to a corresponding layer of the decoder, and the fully connected layer is configured to extract the style attribute information from the sample authentic image and output the style attribute information to multiple layers of the decoder.

6. The method according to claim 1, wherein the second generative model is a StyleGAN2 model, and the decoder has a same structure as a synthesis network of the StyleGAN2 model.

7. The method according to claim 1, further comprising:
acquiring the target image, and inputting the target image into the cartoonization model; and
extracting, in the cartoonization model, a target feature map and target style attribute information of the target image by performing, by the encoder, feature extraction on the target image, and inputting the target feature map and the target style attribute information into the decoder; and generating, by the decoder, a corresponding fully cartoonized image based on the target feature map and the target style attribute information, and outputting the fully cartoonized image.

8. The method according to claim 7, wherein the target image comprises at least one of:
an image input via an image editing page; or
a plurality of image frames from a target video.

9. The method according to claim 1, further comprising:
performing data augmentation on the sample set prior to model fitting using the sample set, wherein the data augmentation comprises randomly performing at least one of random rotation, random cropping, random zooming in, or random zooming out on the sample authentic image and the sample cartoon image.

10. An electronic device for constructing cartoonization models, comprising:
one or more processors; and
a memory, configured to store one or more programs;
wherein the one or more processors, when loading and running the one or more programs, are caused to perform:
generating a predetermined number of sample authentic images using a pre-trained first generative model;
constructing a second generative model based on the first generative model, and generating a sample cartoon image corresponding to each of the sample authentic images using the second generative model;
acquiring a sample image pair by combining the each of the sample authentic images with the corresponding sample cartoon image; and
generating a cartoonization model for converting a target image into a fully cartoonized image by fitting, based on a sample set consisting of multiple sample image pairs, a predetermined initial cartoonization model with a weight corresponding to the second generative model as an initial weight;
wherein the initial cartoonization model comprises an encoder and a decoder; and
the one or more processors, when loading and running the one or more programs, are caused to perform:
acquiring a corresponding feature map and style attribute information by performing, by the encoder, feature extraction on the sample authentic image in the sample set, and outputting the feature map and the style attribute information to the decoder, wherein an initial weight of the encoder is a weight of an encoder in which various real person images are edited previously; and
acquiring the cartoonization model by training, by the decoder with the sample cartoon image in the sample set as a training target and the weight of the second generative model as the initial weight, the feature map and the style attribute information using a predetermined loss function.

11. The electronic device according to claim 10, wherein the one or more processors, when loading and running the one or more programs, are caused to perform:
generating an intermediate cartoon model by adjusting a weight of the first generative model; and
generating the second generative model by replacing a weight corresponding to a partially specified layer in the intermediate cartoon model with a weight corresponding to the partially specified layer in the first generative model and performing weight interpolation.

12. The electronic device according to claim 11, wherein the partially specified layer comprises at least one of: a layer controlling a pose of a character or a layer controlling skin color of a character.

13. The electronic device according to claim 10, wherein loss function comprises a combination of: an adversarial network loss function, a perceptual loss function, and a regression loss function L1_loss; wherein
the adversarial network loss function is configured to determine authenticity of the fully cartoonized image generated by the cartoonization model, and calculate a loss based on a result of the determination;
the perceptual loss function is configured to acquire a corresponding first feature map and second feature map output by a predetermined neural network model by separately inputting the fully cartoonized image output by the cartoonization model and a corresponding sample cartoon image in the sample set into the predetermined neural network model, and calculate an L2 loss between the first feature map and the second feature map; and
the regression loss function L1_loss is configured to calculate an L1 loss between the fully cartoonized image output by the cartoonization model and the corresponding sample cartoon image in the sample set.

14. The electronic device according to claim 10, wherein the encoder comprises:
an input layer, multiple residual layers, and a fully connected layer, wherein the multiple residual layers are configured to extract the feature map from the sample authentic image and output the feature map to a corresponding layer of the decoder, and the fully connected layer is configured to extract the style attribute information from the sample authentic image and output the style attribute information to multiple layers of the decoder.

15. A non-transitory computer-readable storage medium storing a computer program, wherein the computer program, when loaded and run by a processor, causes the processor to perform:
generating a predetermined number of sample authentic images using a pre-trained first generative model;
constructing a second generative model based on the first generative model, and generating a sample cartoon image corresponding to each of the sample authentic images using the second generative model;
acquiring a sample image pair by combining the each of the sample authentic images with the corresponding sample cartoon image; and
generating a cartoonization model for converting a target image into a fully cartoonized image by fitting, based on a sample set consisting of multiple sample image pairs, a predetermined initial cartoonization model with a weight corresponding to the second generative model as an initial weight;
wherein the initial cartoonization model comprises an encoder and a decoder; and the one or more processors, when loading and running the one or more programs, are caused to perform:

acquiring a corresponding feature map and style attribute information by performing, by the encoder, feature extraction on the sample authentic image in the sample set, and outputting the feature map and the style attribute information to the decoder, wherein an initial weight of the encoder is a weight of an encoder in which various real person images are edited previously; and acquiring the cartoonization model by training, by the decoder with the sample cartoon image in the sample set as a training target and the weight of the second generative model as the initial weight, the feature map and the style attribute information using a predetermined loss function.

* * * * *